US010412011B2

(12) United States Patent
Nádas et al.

(10) Patent No.: US 10,412,011 B2
(45) Date of Patent: Sep. 10, 2019

(54) DELAY REQUIREMENT AWARE PACKET FORWARDING CONTROL

(71) Applicant: Telefonaktiebolaget LM Ericsson (publ), Stockholm (SE)

(72) Inventors: Szilveszter Nádas, Budapest (HU); Sándor Rácz, Cegléd (HU); Zoltán Richárd Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 15/310,591

(22) PCT Filed: May 13, 2014

(86) PCT No.: PCT/EP2014/059732
§ 371 (c)(1),
(2) Date: Nov. 11, 2016

(87) PCT Pub. No.: WO2015/172815
PCT Pub. Date: Nov. 19, 2015

(65) Prior Publication Data
US 2017/0085487 A1 Mar. 23, 2017

(51) Int. Cl.
*H04L 12/823* (2013.01)
*H04L 12/833* (2013.01)
*H04L 12/841* (2013.01)
*H04L 12/853* (2013.01)
*H04L 12/865* (2013.01)
*H04L 12/875* (2013.01)

(52) U.S. Cl.
CPC .......... *H04L 47/2416* (2013.01); *H04L 47/28* (2013.01); *H04L 47/283* (2013.01); *H04L 47/31* (2013.01); *H04L 47/32* (2013.01); *H04L 47/56* (2013.01); *H04L 47/6275* (2013.01)

(58) Field of Classification Search
CPC ... H04L 47/2416; H04L 47/28; H04L 47/283; H04L 47/31; H04L 47/32; H04L 47/56; H04L 47/6275
USPC ................................ 370/235, 236, 237, 252
See application file for complete search history.

(56) References Cited

U.S. PATENT DOCUMENTS 8,547,846 B1 * 10/2013 Ma .......................... H04L 47/12
370/235
2008/0144496 A1 6/2008 Bachmutsky

OTHER PUBLICATIONS

Cao, Z., et al., "Rainbow fair queueing: theory and applications", Computer Networks, Received Jan. 29, 2004, available online Oct. 14, 2004, pp. 367-392, Elsevier.
(Continued)

*Primary Examiner* — Melvin C Marcelo
*Assistant Examiner* — Natali Pascual Peguero
(74) *Attorney, Agent, or Firm* — Sage Patent Group

(57) ABSTRACT

A node (120) receives data packets. For each of the received data packets, the node (120) extracts a first value from the data packet. The first value indicates a delay requirement of the data packet. For each of the received data packets, the node (120) also extracts a second value from the data packet. The second value indicates a level of importance assigned to the data packet. Depending on the first values and the second values, the node (120) controls forwarding of the received data packets.

29 Claims, 8 Drawing Sheets

(56) References Cited

OTHER PUBLICATIONS

Jafari, S., et al., "Bandwidth Allocation in WiMAX Networks Using Learning Automaton", World Applied Sciences Journal 15(4), Jan. 1, 2011, pp. 576-538.
Office Action for European Patent Application No. 14723448.8, dated Feb. 8, 2019, 7 pages.

* cited by examiner

DELAY REQUIREMENT AWARE PACKET FORWARDING CONTROL

TECHNICAL FIELD

The present invention relates to methods for controlling packet forwarding and to corresponding devices.

BACKGROUND

In communication networks, e.g., based on the Internet Protocol (IP) and the Transmission Control Protocol (TCP), various kinds of data traffic is transferred. Such different kinds data traffic may differ with respect to their sensitivity concerning delay which occurs while data packets of the data traffic are forwarded through the communication network. For example, for data packets of a file download the delay of the data packets is typically not very relevant. However, in the case of realtime data transfers, such as multimedia streaming, excessive delay of a data packet may adversely impact the user experience because typically data packets need to be available at the receiver at a certain time, and later received data packets are useless.

A known way of addressing such different delay requirements is to strictly prioritize the delay sensitive traffic data over the other data traffic while at the same time limiting the delay sensitive traffic to a maximum bitrate to avoid starvation of the other data traffic. However, in this case the sharing of bandwidth cannot be controlled in a satisfactory manner. For example, it is not possible to address a scenario where certain data traffic is not delay sensitive, but on the other hand has high importance and should therefore be treated with high priority.

In "Rainbow fair queuing: theory and applications" by Zhiruo Cao et al., Computer Networks 47 (2005), a method is proposed which allow for fair sharing of bandwidth on the basis of a "color" label assigned to the data packets, without requiring separation of the data traffic into different flows. The color label is used in a router for controlling discarding of data packets. However, in this case all traffic will experience substantially the same delay. Therefore, in order to meet a requirement for low delay, such low delay needs to be achieved for all traffic. However, providing such low delay also for non-delay sensitive traffic may result in a throughput degradation, e.g., because larger buffers are required for optimal TCP operation.

Accordingly, there is a need for techniques which allow for efficiently controlling the handling of different kinds of data traffic.

SUMMARY

According to an embodiment of the invention, a method of handling data traffic is provided. According to the method, a node receives data packets. For each of the received data packets, the node extracts a first value from the data packet. The first value indicates a delay requirement of the data packet. For each of the received data packets, the node also extracts a second value from the data packet. The second value indicates a level of importance assigned to the data packet. Depending on the first values and the second values, the node controls forwarding of the received data packets.

According to a further embodiment of the invention, a method of handling data traffic is provided. According to the method, a node generates data packets. In each of the data packets, the node includes a first value. The first value indicates a delay requirement of the data packet. Further, the node also includes a second value in each of the data packets. The second value indicates a level of importance assigned to the data packet. Further, the node sends the data packets towards a receiver.

According to a further embodiment of the invention, a method of handling data traffic is provided. According to the method, a first node generates data packets. In each of the data packets, the first node includes a first value. The first value indicates a delay requirement of the data packet. Further, the first node includes a second value in each of the data packets. The second value indicates a level of importance assigned to the data packet. Further, the first node sends the data packets towards a receiver. A second node receives these data packets. For each of the received data packets, the second node extracts the first value from the data packet. For each of the received data packets, the second node also extracts the second value from the data packet. Depending on the first values and the second values, the second node controls forwarding of the received data packets towards the receiver.

According to a further embodiment of the invention, a node for a data communication system is provided. The node comprises at least one interface for receiving and forwarding data packets. Further, the node comprises at least one processor. The at least one processor is configured to extract a first value from each of the received data packets. The first value indicates a delay requirement of the data packet. Further, the at least one processor is configured to extract a second value from each of the received data packets. The second value indicates a level of importance assigned to the data packet. Further, the at least one processor is configured to control forwarding of the received data packets depending on the first values and the second values.

According to a further embodiment of the invention, a node for a data communication system is provided. The node comprises at least one interface for sending data packets. Further, the node comprises at least one processor. The at least one processor is configured to generate the data packets. Further, the at least one processor is configured to include a first value in each of the data packets. The first value indicates a delay requirement of the data packet. Further, the at least one processor is configured to include a second value in each of the data packets. The second value indicates a level of importance assigned to the data packet. Further, the at least one processor is configured to send the data packets towards a receiver.

According to a further embodiment of the invention, a data communication system is provided. The data communication system comprises a first node and a second node. The first node is configured to generate data packets. Further, the first node is configured to include a first value and a second value in each of the data packets. The first value indicates a delay requirement of the data packet. The second value indicates a level of importance assigned to the data packet. Further, the first node is configured to send the data packets towards a receiver. The second node is configured to receive these data packets. Further, the second node is configured to extract the first value and the second value from each of the data packets. Further, the second node is configured to control forwarding of the received data packets towards the receiver depending on the first values and the second values.

According to a further embodiment of the invention, a computer program or computer program product is provided, e.g., in the form of a non-transitory storage medium, which comprises program code to be executed by at least one processor of a node of a data communication system.

Execution of the program code causes the at least one processor to receive data packets. Further, execution of the program code causes the at least one processor to extract a first value from each of the received data packets. The first value indicates a delay requirement of the data packet. Further, execution of the program code causes the at least one processor to extract a second value from each of the received data packets. The second value indicates a level of importance assigned to the data packet. Further, execution of the program code causes the at least one processor to control forwarding of the received data packets depending on the first values and the second values.

According to a further embodiment of the invention, a computer program or computer program product is provided, e.g., in the form of a non-transitory storage medium, which comprises program code to be executed by at least one processor of a node of a data communication system. Execution of the program code causes the at least one processor to generate data packets. Further, execution of the program code causes the at least one processor to include a first value in each of the data packets. The first value indicates a delay requirement of the data packet. Further, execution of the program code causes the at least one processor to include a second value in each of the data packets. The second value indicates a level of importance assigned to the data packet. Further, execution of the program code causes the at least one processor to send the data packets towards a receiver.

Details of such embodiments and further embodiments will be apparent from the following detailed description of embodiments.

DETAILED DESCRIPTION OF EMBODIMENTS

In the following, concepts according to embodiments of the invention will be explained in more detail by referring to the accompanying drawings. The illustrated concepts relate to handling data traffic in a data communication system. Specifically, the concepts relate to controlling forwarding of data packets by a node of such data communication system. The data communication system may for example be part of a communication network. One example of such communication network is a cellular network, e.g., based on GSM (Global System for Mobile Communication), UMTS (Universal Mobile Telecommunications System), or LTE (Long Term Evolution) technologies specified by 3GPP ($3^{rd}$ Generation Partnership Project). However, the concepts could also be applied in other communication systems or networks. The data packets may be IP data packets.

In the concepts as illustrated in the following, data packets are labeled by including a first value and a second value. The first value indicates a delay requirement of the data packet, e.g., in terms of a maximum delay the data packet may experience when being forwarded by a node. The first value allows for assigning the data packets to different delay classes, e.g., high delay sensitivity, medium delay sensitivity, and no or low delay sensitivity. The second value indicates a level importance assigned to the data packet. The second value allows for comparing importance levels among the data packets, even if these data packets have different delay requirements or are assigned to different delay classes. A node which is responsible for forwarding the data packets, extracts the first and second values from the data packets and controls the forwarding of the data packets depending on the first and second values. In the case of a congestion, this may also involve discarding one or more of the data packets. Such congestion may for example be identified by detecting that for a certain delay class the delay requirement cannot be met. In the case of a congestion, the packets for which the second value indicates the lowest level of importance will be discarded first. In addition, also the delay class may be considered in this discard decision. In particular, assuming that delay classes corresponding to a stricter delay requirement will typically be prioritized in some way, a congestion which occurs for one delay class may be resolved by discarding data packets assigned to one or more other delay classes having a less strict delay requirement.

Figure 1:
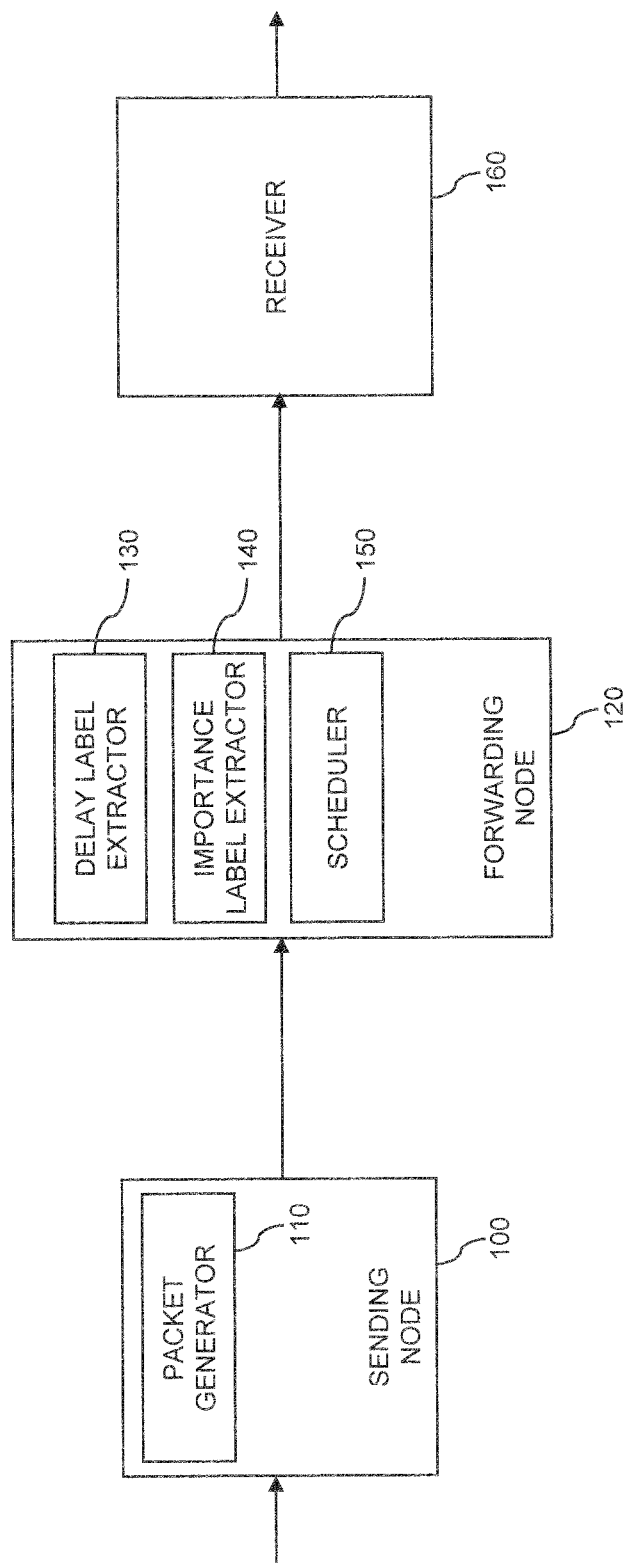
FIG. 1 schematically illustrates a data communication system according to an embodiment of the invention.

FIG. 1 schematically illustrates a data communication system in which the concepts may be applied. As illustrated, the data communication system includes a first node 100 which sends data packets, in the following also referred to as sending node, and a second node 120 which forwards the data packets, in the following also referred to as forwarding node. The sending node 100 sends the data packets towards a receiver 160, which may part of the data communication system or may be an external element. The forwarding node 120 receives the data packets from the sending node 100 and forwards the data packets towards the receiver 160.

The data communication system of FIG. 1 may be part of a data communication network which includes additional nodes. For example, such additional nodes could be further sending nodes, further forwarding nodes, or further receivers. Various connection topologies are possible in such data communication network. For example, one or more additional forwarding nodes could be connected between the sending node 100 and the forwarding node 120 or between the forwarding node 120 and the receiver. Further, one or more additional sending nodes could send data packets via the forwarding node 120 to the receiver 160 and/or to additional receivers. Still further, the sending node 100 could send data packets via the forwarding node to additional receivers.

As illustrated, the sending node 100 is provided with a packet generator 110. The packet generator 110 generates the data packets which are sent via the forwarding node 120 towards the receiver 160. The packet generator 110 may include various kinds of data into the data packet, e.g., data which is locally generated at the sending node 100 and/or data received from one or more external sources. In some scenarios, the sending node 100 may correspond to an edge node through which external data packets are transmitted into the data communication system. The operations of the packet generator 110 may then for example involve encapsulating the external data packets in the data packets which are sent via the forwarding node 120 towards the receiver 160. For generating the data packets, the packet generator 110 may apply various protocols. For example, in addition to the above-mentioned IP, also TCP, UDP (User Datagram Protocol), or a tunneling protocol such as GTP (General Packet Radio Service Tunneling Protocol).

Figure 2:
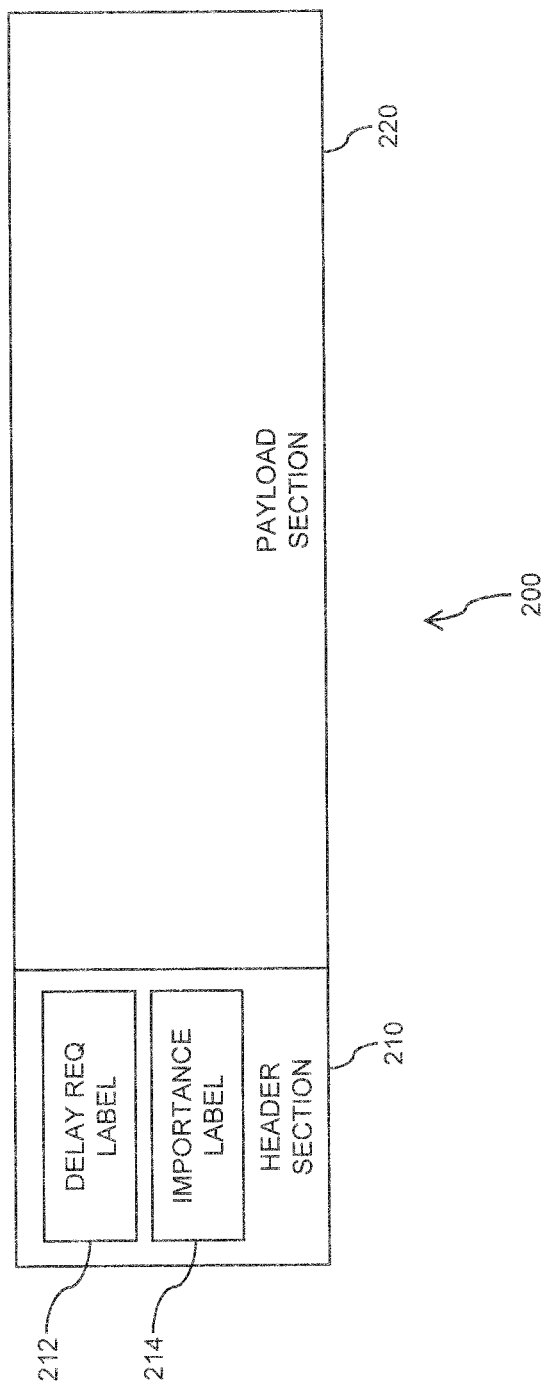
FIG. 2 schematically illustrates a data packet as utilized according to an embodiment of the invention.

Further, the operations of the packet generator include labeling of the data packets which are sent via the forwarding node 120 towards the receiver 160. This is achieved by including the first value and the second value into the data packets. For example, as illustrated in FIG. 2, the first value and the second value may be included in corresponding labels in a header section of each data packet. The sending node 120 then sends the labeled data packets via the forwarding node 120 towards the receiver 160.

The forwarding node 120 receives the labeled data packets and extracts the first value and the second value therefrom. For this purpose, the forwarding node is provided with a delay label extractor 130, which extracts the first value from each received data packet, and an importance label extractor 140, which extracts the second value from each received data packet. The first values and the second values are then utilized by a scheduler 150, which controls the forwarding of the data packets towards the receiver 160. Operations of the scheduler may involve utilizing the first value to assign each data packet to one of multiple delay classes and utilizing the second value for controlling discarding of one or more of the data packets. In particular, in response to detecting that one of the delay classes is subject to congestion, the scheduler 150 may discard one or more of the data packets assigned to at least one other of the delay classes having a stricter delay requirement. These data packets may be selected depending on the respective second value, which means that data packets having a high level of importance may be protected from being discarded, while the congestion may be relieved by discarding data packets which have a lower level of importance and a stricter delay requirement (which otherwise would be forwarded with higher priority than the congested delay class). In some cases also data packets assigned to the delay class which subject to congestion may be discarded depending on their second value.

The congestion may be detected in a delay class specific manner. For this purpose, the scheduler 150 may estimate, for of the data packets received by the forwarding node 120, whether the delay requirement indicated in the data packet can be met by the forwarding node 120. For this purpose, the first value extracted from the data packet may be compared to an estimated delay associated with forwarding the data packets. The latter information may for example be obtained from a throughput which is currently achievable for sending the data packets from the forwarding node and from a fill level of one or more queues which are provided for temporarily storing the data packets in the forwarding node 120. If the delay requirement cannot be met, the scheduler 150 may conclude that the delay class to which the data packets is assigned is subject to congestion.

For performing the discard decisions, the scheduler 150 may define an importance level threshold and discard those data packets for which the second value is below the importance level threshold. Further, the discard decisions could be based on a discard probability function. The discard probability function controls, depending on the second value extracted from the data packet, a probability of randomly discarding the data packet. That is to say, data packets with higher importance level, i.e., higher second value, would have a lower probability of being discarded, while data packets with lower importance level would have a higher probability of being discarded. For achieving the above-mentioned discarding of data packets from other delay classes having a stricter delay requirement, the discard probability function for these data packets may be set to a maximum value. As compared to the above solution on the basis of the importance level threshold, this allows for implementing a "softer" discard policy, in which a certain portion of the data packets of the other delay classes is not discarded.

FIG. 2 schematically illustrates an exemplary structure of a data packet 200 which may be utilized for implementing the above-described concepts. The data packet 200 may for example be IP based. Further, the data packet 200 may be based on various kinds of additional protocols, e.g., a transport protocol such as TCP or UDP, or a tunnelling protocol such as GTP.

As illustrated, the data packet 200 includes a header section 210 and a payload section 220. The payload section 220 may for example include user data. If a tunnelling protocol is utilized, the payload section 220 may also include one or more encapsulated data packets.

The header section 210 typically includes various kinds of information which is needed for propagation of the data packet 200 through the data communication system. For example, such information may include a destination address and/or source address.

As further illustrated, the header section 210 includes a delay requirement label 212 and an importance label 214. The delay requirement label 212 includes the first value and the importance label 214 includes the second value. The delay requirement label 212 and the importance label 214 may for example be included in corresponding information fields in the header section 210. For this purpose, corresponding information fields may be defined for the above-mentioned protocols or existing information fields may be reused.

Figure 3:
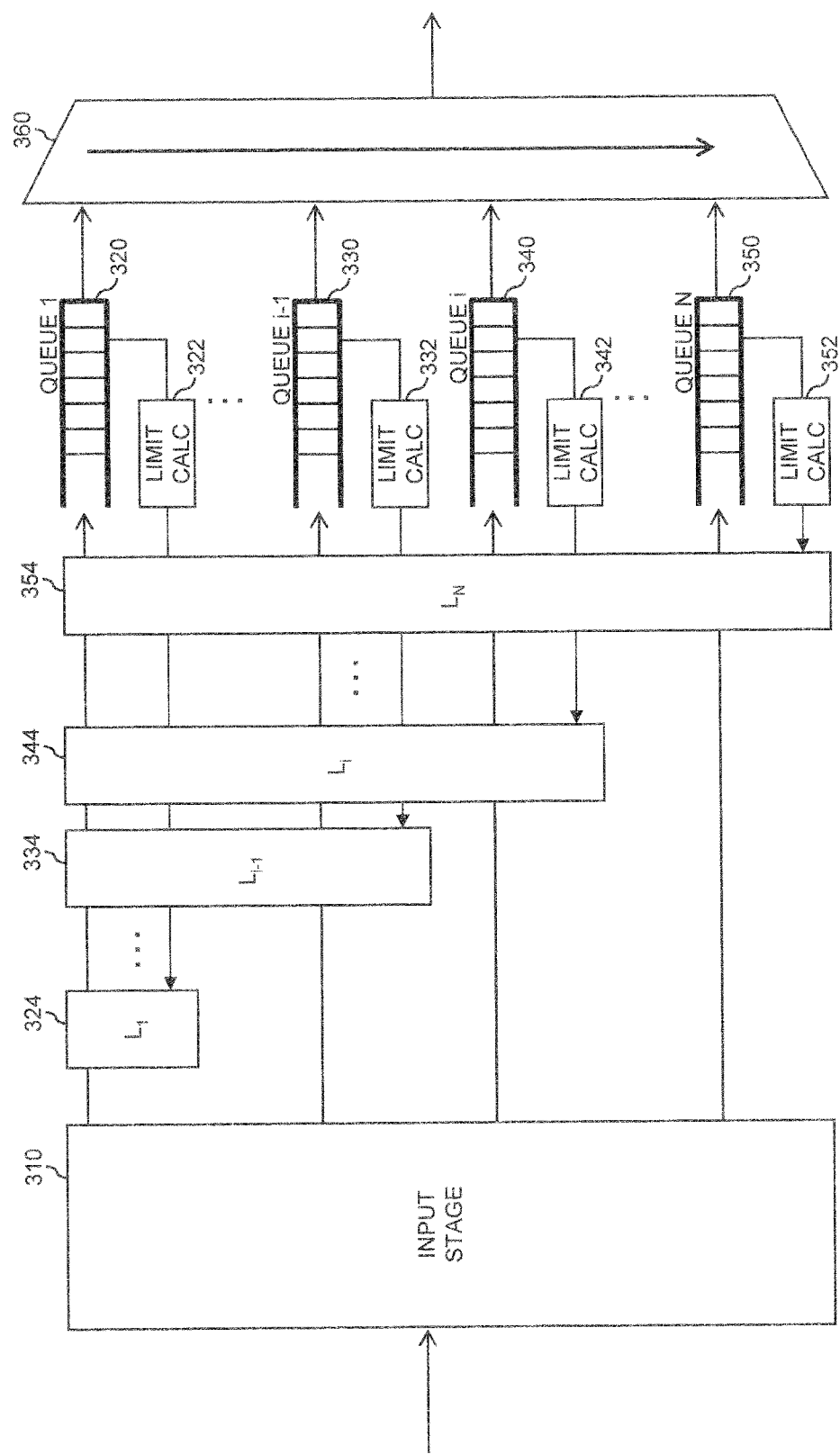
FIG. 3 schematically illustrates a packet forwarding architecture according to an embodiment of the invention.

FIG. 3 schematically illustrates an exemplary a packet forwarding architecture which may be used to implement the above-described concepts. For example, the packet forwarding architectures of FIG. 3 may be used to implement the scheduler 150 in the forwarding node 120 of FIG. 1.

As illustrated, the packet forwarding architecture of FIG. 3 includes an input stage 310 which receives the incoming data packets. The input stage 310 sorts the data packets according to the delay requirement indicated by the second value and assigns each data packet to one of the delay classes.

In accordance with this delay class assignment, the input stage 310 provides the data packets to different queues 320, 330, 340, 350. In particular, for each delay class, a corresponding queue 320, 330, 340, 350 is provided, in which the data packets are temporarily stored before being forwarded from the forwarding node 120. In the illustrated example, it is assumed that the queues are arranged in the order of decreasing delay requirement and the queue 320 (queue 1) corresponds to the strictest delay requirement, whereas the queue 350 (queue N) corresponds to the least strict delay requirement. Here, it should be noted that if the delay requirement is defined in terms of a maximum allowable delay, a lower first value corresponds to a stricter delay requirement.

As further illustrated, the packet forwarding architecture of FIG. 3 provides a limit calculator 322, 332, 342, 352 for each of the queues. Depending on the congestion status of the corresponding delay class, the limit calculator 322, 332, 342, 352 determines a congestion limitation parameter which is applied to its associated queue 320, 330, 340, 350 and to the other queues which correspond to a delay class with stricter delay requirement. For example, if the congestion occurs in the delay class corresponding to the queue 340 (queue i), the limit calculator 342 associated with this queue 340 determines a congestion limitation parameter to be applied to the queue i and to the queues 1 to i−1, which correspond to delay classes with stricter delay requirement. The limit calculators 322, 332, 342, 352 may use various input variables for determining the congestion limitation parameter. For example, the delay requirements of the data packets in the associated queue 320, 330, 340, 350 may be used as input variable. Further, also the currently estimated delay associated with the queue may be used. Also a history of such input variables may be utilized.

The congestion limitation parameter may be an importance level threshold for comparison to the second value extracted from the data packets. In the implementation of FIG. 3, this comparison is accomplished by a limit stage 324, 334, 344, 354 associated with each of the queues 320, 330, 340, 350. As illustrated in FIG. 3, the data packets assigned to the queue 320 are provided through the limit stage 324 to the queue 320, the data packets assigned to the queue 330 are provided through the limit stage 334 to the queue 330, the data packets assigned to the queue 340 are provided through the limit stage 344 to the queue 340, and the data packets assigned to the queue 350 are provided through the limit stage 354 to the queue 350.

Further, the data packets are also fed through the limit stages 334, 344, 354 corresponding to delay classes with less strict delay requirement. In the example of FIG. 3 this means that the data packets assigned to the queue 320 are also fed through the limit stages 334, 344, and 354, the data packets assigned to the queue 330 are also fed through the limit stages 344 and 354, and the data packets assigned to the queue 340 are also fed through the limit stage 354. In other words, data packets assigned to a given queue with index k=1, . . . , N are also fed through the limit stages corresponding to queues k+1, . . . , N. In this way, it is achieved that the congestion limitation parameter determined for a given delay class is also applied to the other delay classes which have a stricter delay requirement.

The limit stages 324, 334, 344, 354 may operate as follows: If the second value extracted from a given data packet is below the importance level threshold, the data packet is discarded and not provided to the corresponding queue 320, 330, 340, 350. Otherwise, the data packet is provided to the corresponding queue 320, 330, 340, 350 and then later forwarded towards the receiver 160. Accordingly, discarding of the data packets is accomplished before storing the data packets in the queues 320, 330, 340, 350.

As an alternative to utilizing the importance level threshold, the limit stages 324, 334, 344, 354 may also apply a discard probability function for deciding depending on the second value whether a given data packet is to be discarded. As mentioned above, the discard probability function is a function of the second value and controls the probability of randomly discarding the data packet. This discard probability function may be adjusted by depending on the congestion limitation parameter. In particular, the way of translating the second value to the probability may be adjusted to yield a maximum discard probability for a given importance level. For example, the probability may be an decreasing function of the second value and an increasing function of the congestion limitation parameter, and by setting the congestion limitation parameter to a maximum value, e.g., for which the discard probability of the lowest possible importance level is 100%, also maximum probabilities of discarding may also be set for higher importance levels. This may be accomplished in such a way that there is still differentiation between the importance levels, i.e., the maximum discard probability may still be a decreasing function of the second value.

As further illustrated, the packet forwarding architecture of FIG. 3 includes a scheduling stage 360 which selects data packets for forwarding from the queues 320, 330, 340, 350. The scheduling stage 360 may be based on various kinds of scheduling algorithms which allow for prioritizing a queue with a stricter delay requirement over the other queues. One example of a suitable scheduling algorithm is a strict priority scheduling algorithm which strictly prioritizes the queue 320 over the queues 330, 340, and 350, strictly prioritizes the queue 330 over the queues 340 and 350, and strictly prioritizes the queue 340 over the queue 350, i.e., provides a strict priority in the order of increasing index of the queue 320, 330, 340, 350. However, in other implementations also more flexible prioritization schemes could be utilized, e.g., schemes which further consider the fill level of a queue for determining its priority.

Figure 4:
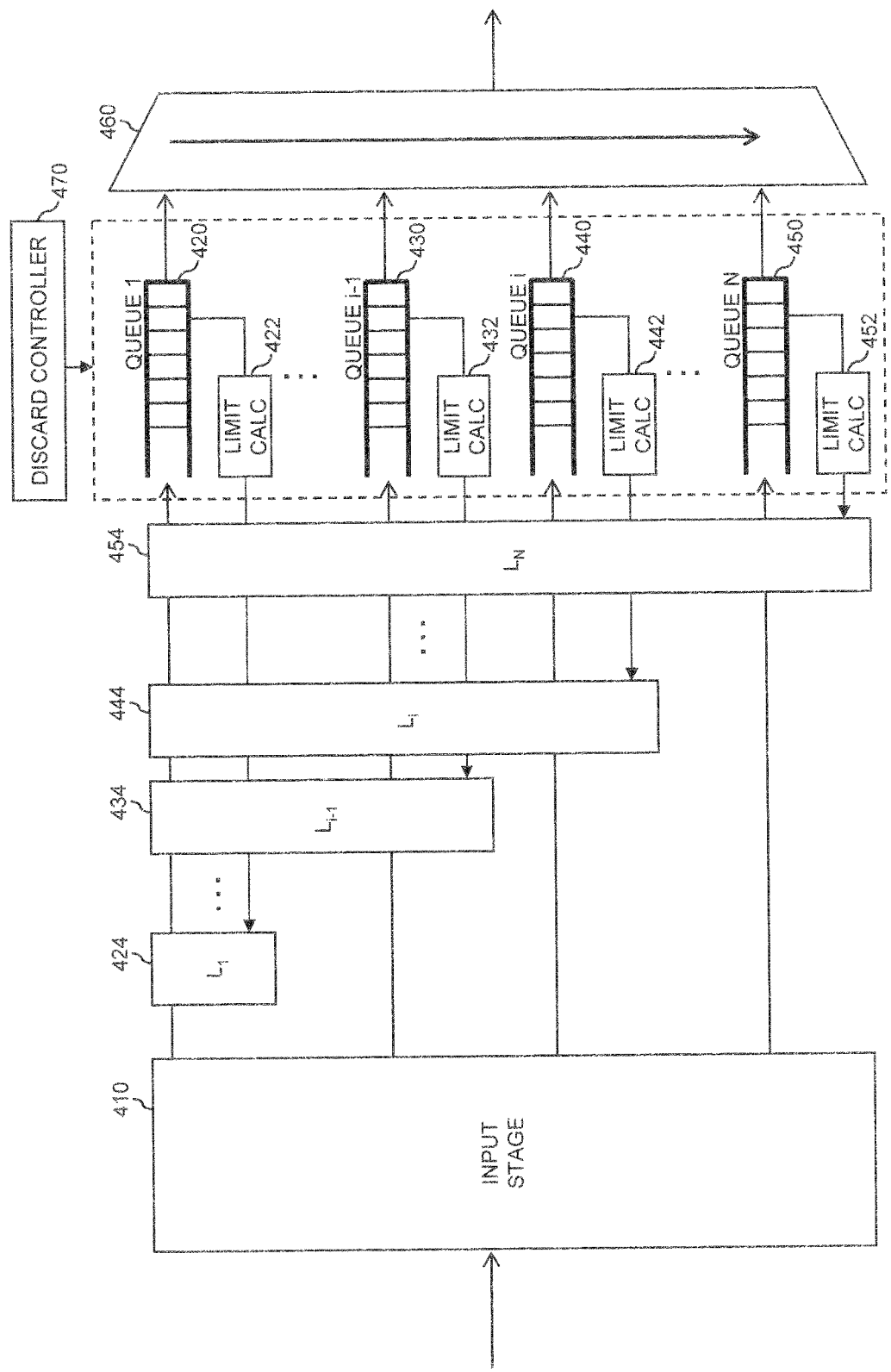
FIG. 4 schematically illustrates a further packet forwarding architecture according to an embodiment of the invention.

FIG. 4 schematically illustrates a further exemplary packet forwarding architecture which may be used to implement the above-described concepts. Also the packet forwarding architecture of FIG. 4 may be used to implement the scheduler 150 in the forwarding node 120 of FIG. 1. The packet forwarding architecture of FIG. 4 is generally similar to that of FIG. 3 and includes an input stage 410 having similar functionalities as the input stage 310 of FIG. 3, queues 420, 430, 440, 450 having similar functionalities as the queues 320, 330, 340 350 of FIG. 3, limit calculators 422, 432, 442, 452 having similar functionalities as the limit calculators 322, 332, 342, 352 of FIG. 3, limit stages 424, 434, 444, 454 having similar functionalities as the limit stages 324, 334, 344, 354 of FIG. 3, and a scheduling stage 460 having similar functionalities as the scheduling stage 360 of FIG. 3.

However, as compared to the packet forwarding architecture of FIG. 3, in which the data packets are discarded before being stored in the queues 320, 330, 340, 350, the packet forwarding architecture of FIG. 4 also allows for discarding data packets which are already stored in the queues 420, 430, 440, 450. For this purpose, a discard controller 470 is provided, which provides discard policies to each queue 420, 430, 440, 450. In some implementations, also a separate discard controller may be provided for each of the queues 420, 430, 440, 450. Such discard policy, which is intended to resolve a congestion in a certain delay class, may apply to the queues corresponding to the delay classes with stricter delay requirement than the delay class which is subject to congestion and optionally also to the delay class which is subject to congestion. Similar as in the limit stages 424, 434, 444, 454 these discard policies can also be based on the importance level threshold or discard probability function. As compared to the packet forwarding architecture of FIG. 3, the packet forwarding architecture of FIG. 4 allows for applying less strict discard policies in the limit stages 424, 434, 444, 454 because it is also possible to discard already queued data packets can if the congestion situation gets worse.

Figure 5:
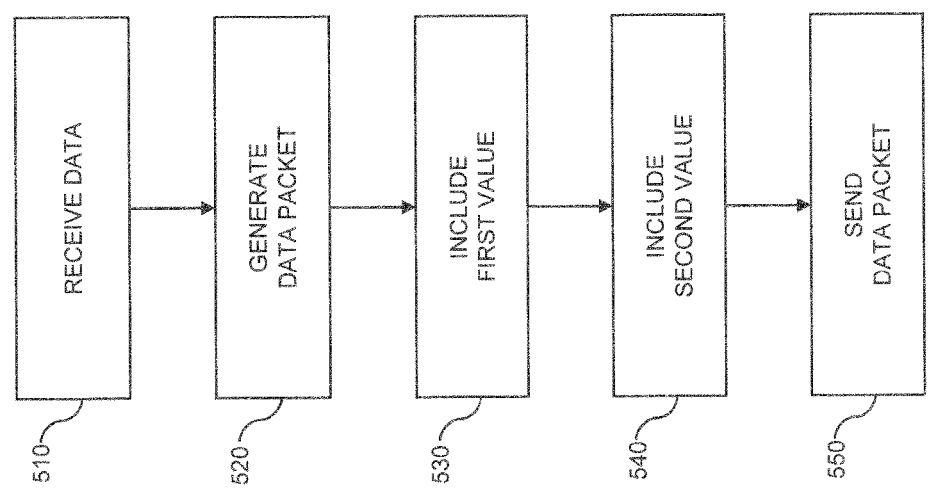
FIG. 5 shows a flowchart for illustrating a packet handling method according to an embodiment of the invention, which may be implemented in a sending node.

FIG. 5 shows a flowchart for illustrating a method of handling data traffic in a data communication system. The method of FIG. 5 may be used for implementing the above-described concepts in the sending node 100. If a processor based implementation of the sending node 100 is used, the steps of the method may be performed by one or more processors of the sending node 100. For this purpose, the processor(s) may execute correspondingly configured program code. Further, at least some of the corresponding functionalities may be hardwired in the processor(s).

At step 510, the sending node 100 may receive data. The data may be received from various sources. According to one example, the sending node corresponds to an edge node of the data and the received data include data packets to be further transmitted in or through the data communication system.

At step 520, the sending node 100 generates a data packet. For example, the data packet may be generated as an IP based data packet. In addition various other protocols may be used, e.g., transport protocols such as TCP or UDP and/or tunneling protocols such as GTP. The data received at step 510 or data otherwise obtained by the sending node 100 may be include in a payload section of the data packet. If the sending node 100 corresponds to an edge node, the process of generating the data packet may also involve encapsulating one or more data packets received at step 510. The data packet may for example be generated with a structure as illustrated in FIG. 2.

At step 530, the sending node 100 includes a first value in the data packet. The first value indicates a delay requirement of the data packet. The first value may for example be a numerical value which indicates a maximum allowed time associated with forwarding of the data packet by a node of the data communication system, e.g., by the forwarding node 120. The first value may be included in a header section of the data packet, e.g., in the delay requirement label 212 as illustrated in FIG. 2.

At step 540, the sending node 100 includes a second value in the data packet. The second value indicates an importance level of the data packet. The second value may for example be a numerical value which allows for comparing the importance levels of different data packets, irrespective of their delay requirements. The second value may be included in a header section of the data packet, e.g., in the delay requirement label 212 as illustrated in FIG. 2.

At step 550, the sending node 100 sends the data packet towards a receiver, e.g., the receiver 160.

The steps 510 may then be repeated for generating and sending further data packets. Accordingly, the sending node includes the first value and the second value in each generated and sent data packet.

Figure 6:
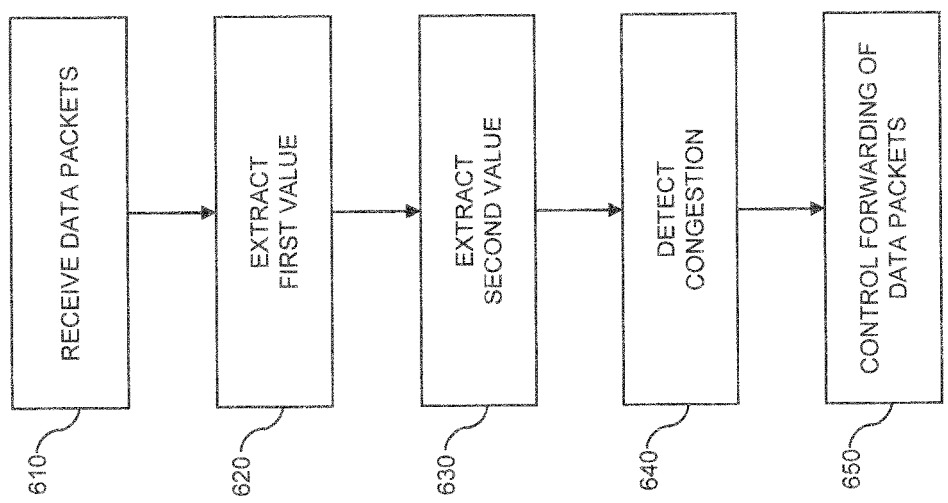
FIG. 6 shows a flowchart for illustrating a packet handling method according to an embodiment of the invention, which may be implemented in a forwarding node.

FIG. 6 shows a flowchart for illustrating a method of handling data traffic in a communication system. The method of FIG. 6 may be used for implementing the above-described concepts in the forwarding node 120. If a processor based implementation of the forwarding node 120 is used, the steps of the method may be performed by one or more processors of the forwarding node 120. For this purpose, the processor(s) may execute correspondingly configured program code. Further, at least some of the corresponding functionalities may be hardwired in the processor(s).

At step 610, the forwarding node 120 receives data packets. The data packets may for example be received from the sending node 100 and be generated and sent according to the method of FIG. 5. The data packets may for example be IP based data packets. In addition various other protocols may be used, e.g., transport protocols such as TCP or UDP and/or tunneling protocols such as GTP. The data packets may also include encapsulated other data. The data packets may for example have a structure as illustrated in FIG. 2.

At step 620, the forwarding node 120 extracts a first value from each of the data packets received at step 610. The first value indicates a delay requirement of the data packet. The first value may for example be a numerical value which indicates a maximum allowed time associated with forwarding of the data packet by a node of the data communication system, e.g., by the forwarding node 120. The first value may be included in a header section of the data packet, e.g., in the delay requirement label 212 as illustrated in FIG. 2.

At step 630, the forwarding node 120 extracts a second value from each of the data packets received at step 610. The second value indicates an importance level of the data packet. The second value may for example be a numerical value which allows for comparing the importance levels of different data packets, irrespective of their delay requirements. The second value may be included in a header section of the data packet, e.g., in the delay requirement label 212 as illustrated in FIG. 2.

At step 640, the forwarding node 120 detects a congestion. For this purpose, the forwarding node may estimate a delay associated with forwarding of one of the received data packets. The forwarding node 120 may then compare the estimated delay to the first value extracted from this data packet. Depending on the comparison, the forwarding node may then detecting whether or not a delay class to which the data packet is assigned is subject to congestion. For example, if the estimated delay is lower than a maximum delay allowed by the delay requirement, the delay requirement can be met by the forwarding node 120 and the forwarding node 120 may conclude that the delay class is not subject to congestion. On the other hand, if the estimated delay is exceeds the maximum delay allowed by the delay requirement, the delay requirement cannot be met by the forwarding node 120 and the forwarding node 120 may conclude that the delay class is subject to congestion.

At step 650, the forwarding node 120 controls forwarding of the data packets towards a receiver, e.g., the receiver 160. This is accomplished depending on the first values and second values extracted at steps 620 and 630. This may involve that, depending on the first value, the forwarding node 120 assigns each received data packet to one of multiple delay classes. In response to detecting that one of the delay classes is subject to congestion at step 640, the forwarding node 120 may discard one or more of the data packets assigned to at least one other of the delay classes which have a stricter delay requirement. This discarding is performed depending on the respective second value which typically means that data packets with a lower second value will be discarded before data packets having a higher second value. In addition to discarding data packets assigned to the other delay classes, the forwarding node 120 may also discard data packets assigned to the delay class which was detected to be subject to congestion.

For performing the discarding of the data packets, the forwarding node 120 may determine one or more importance level thresholds, e.g., an importance level threshold for each of the delay classes from which data packets are to be discarded. In this case, the discarded data packets may be those data packets for which the second value is below the importance level threshold. Alternatively, the forwarding node may apply a discard probability function which, depending on the second value, controls a probability of randomly discarding a data packet, and discard the data packets according to the discard probability function. In this case, the forwarding node 120 may select a maximum value of the discard probability function for the data packets which are assigned to the at least one other of the delay classes with stricter delay requirement.

In some implementations, the forwarding node may provide a corresponding queue for each of the delay classes. Examples of such implementations are based on a packet forwarding architecture as illustrated in FIG. 3 or 4. The forwarding node 120 may then perform the discarding of the data packets with respect to data packets to be stored in the queues, e.g., as explained in connection with FIG. 3. Alternatively or in addition, the forwarding node may perform the discarding of the data packets with respect to data packets already stored in the queues, e.g., as explained in connection with FIG. 4. The forwarding node 120 may apply a strict-priority scheduling algorithm for controlling the forwarding of the data packets from the queues. However, other scheduling algorithms which, e.g., based on dynamic prioritization, could be used as well.

It is to be understood that the methods of FIGS. 5 and 6 may also be combined, e.g., in a data communication system which includes a first node which sends data packets according to the method of FIG. 5 and a second node which receives and forwards the data packets according to the method of FIG. 6.

Figure 7:
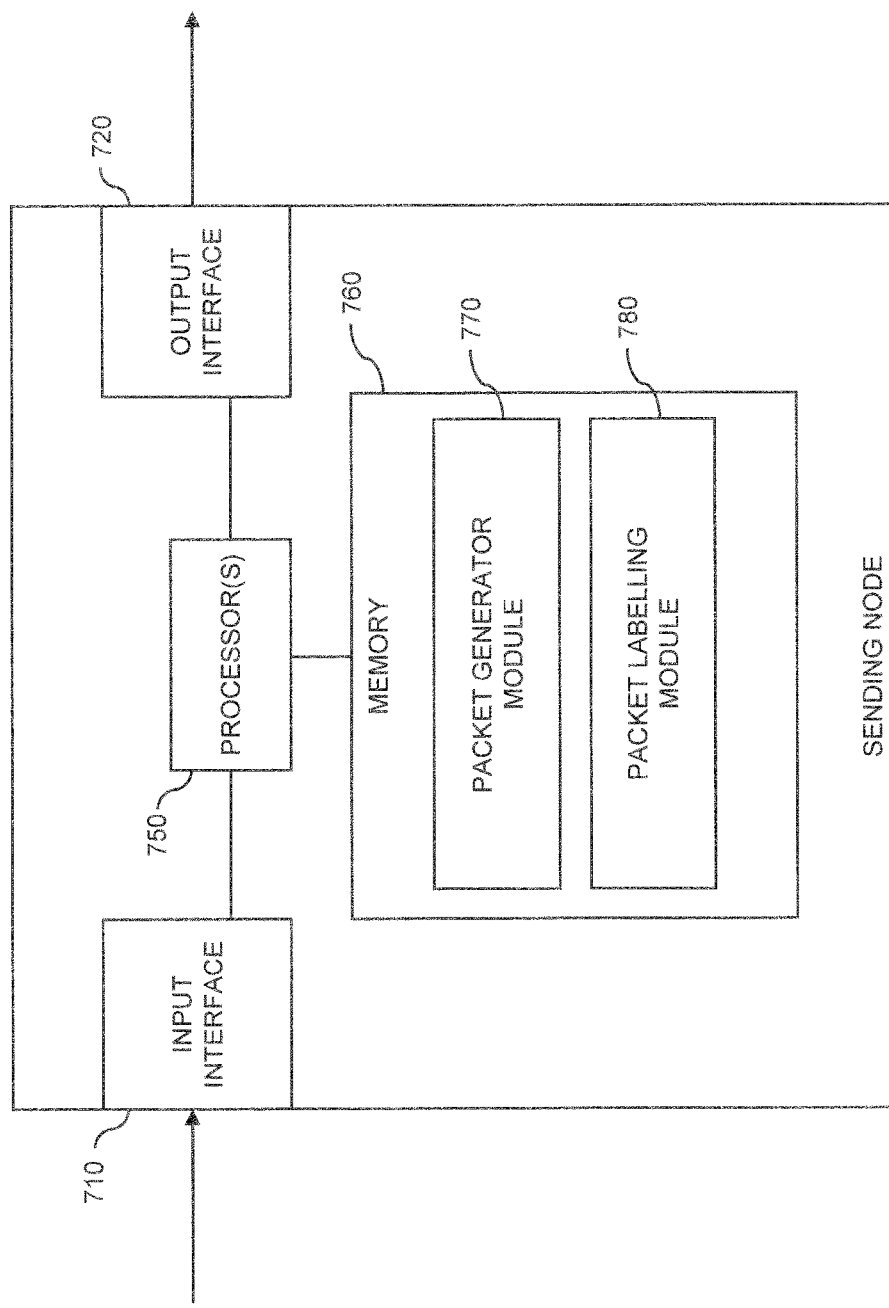
FIG. 7 schematically illustrates structures of a sending node according to an embodiment of the invention.

FIG. 7 illustrates exemplary structures for implementing a node which operates in accordance with the above-described concepts. For example, the illustrated structures may be used to implement the sending node 100.

As illustrated, the node may include an input interface 710 for receiving data, e.g., as explained in connection with step 510 of FIG. 5, and an output interface 720 for sending data packets, e.g., as explained in connection with step 550 of FIG. 5. The input interface 710 and/or the output interface 720 may be IP based.

Further, the node includes one or more processor(s) 750 coupled to the interfaces 710, 720, and a memory 760 coupled to the processor(s) 750. The memory 760 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 760 includes suitably configured program code modules to be executed by the processor(s) 750 so as to implement the above-described functionalities of the sending node 100, e.g., as illustrated by the method of FIG. 5. More specifically, the program code modules in the memory 760 may include a packet generator module 770 so as to implement the above-described functionalities of generating data packets, e.g., as explained in connection with step 520 of FIG. 5. Further, the program code modules in the memory 760 may include a packet labeling module 580 so as to implement the above-described functionalities of including the first value and the second value in the data packets, e.g., as explained in connection with steps 530 and 540 of FIG. 5.

It is to be understood that the structures as illustrated in FIG. 7 are merely schematic and that the node may actually include further components which, for the sake of clarity, have not been illustrated, e.g., further interfaces or further processors. Also, it is to be understood that the memory 760 may include further types of program code modules, which have not been illustrated, e.g., program code modules for implementing known functionalities of an node of a data communication system. In some implementations, also a computer program may be provided for implementing functionalities of the node, e.g., in the form of a physical medium storing the program code modules to be stored in the memory 760 or by making such program code available for download or streaming.

Figure 8:
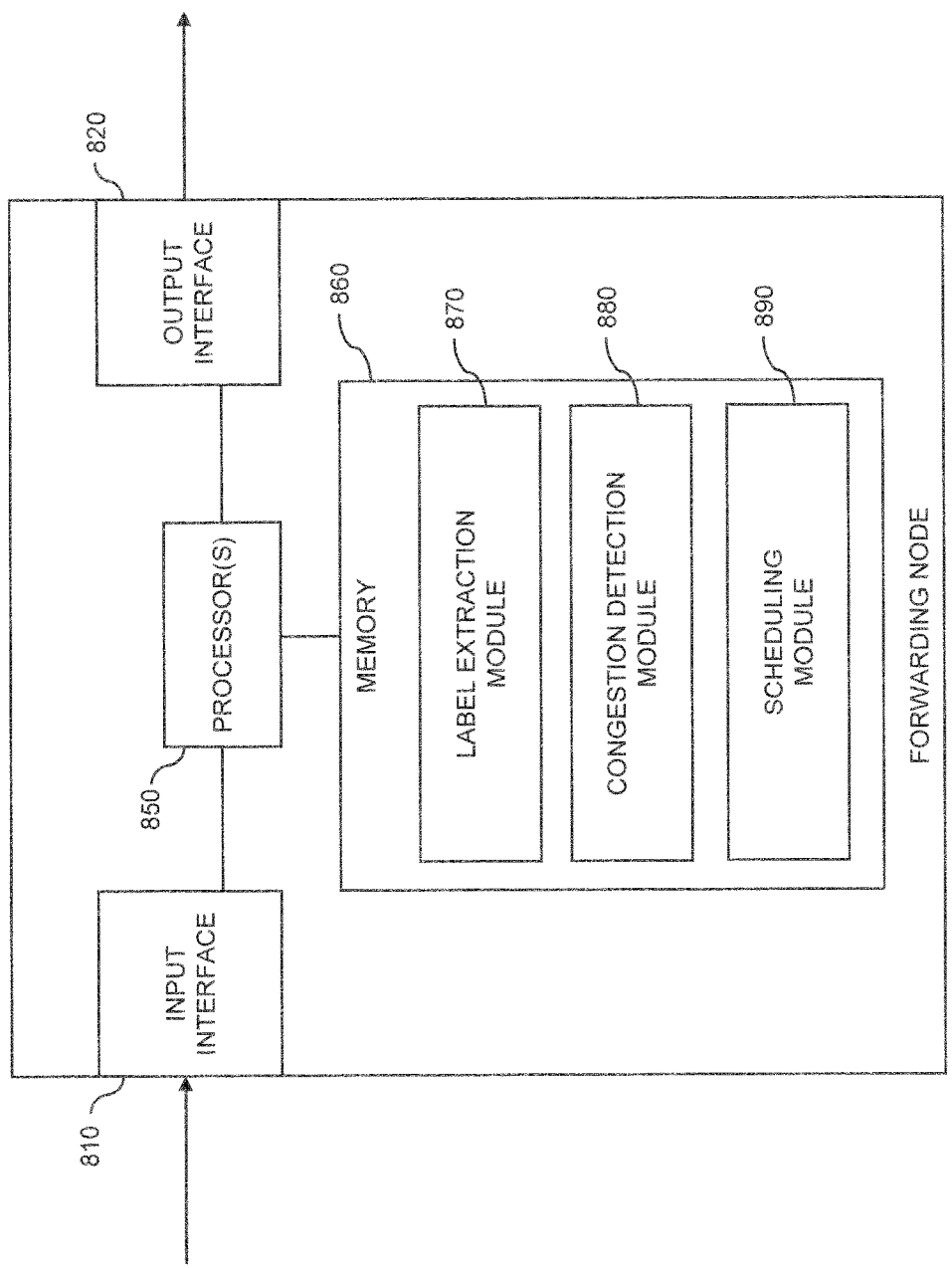
FIG. 8 schematically illustrates structures of a forwarding node according to an embodiment of the invention.

FIG. 8 illustrates exemplary structures for implementing a node which operates in accordance with the above-described concepts. For example, the illustrated structures may be used to implement the forwarding node 120.

As illustrated, the node may include an input interface 810 for receiving data packets, e.g., as explained in connection with step 610 of FIG. 5, and an output interface 820 for forwarding the received data packets, e.g., as explained in connection with step 650 of FIG. 6. The input interface 810 and/or the output interface 820 may be IP based.

Further, the node includes one or more processor(s) 850 coupled to the interfaces 810, 820, and a memory 860 coupled to the processor(s) 850. The memory 860 may include a ROM, e.g., a flash ROM, a RAM, e.g., a DRAM or SRAM, a mass storage, e.g., a hard disk or solid state disk, or the like. The memory 860 includes suitably configured program code modules to be executed by the processor(s) 850 so as to implement the above-described functionalities of the forwarding node 120, e.g., as illustrated by the method of FIG. 6. More specifically, the program code modules in the memory 860 may include a label extraction module 870 so as to implement the above-described functionalities of extracting the first value and the second value from the data packets, e.g., as explained in connection with steps 620 and 630 of FIG. 6. Further, the program code modules in the memory 860 may include a congestion detection module 880 so as to implement the above-described functionalities of detecting a congestion, e.g., as explained in connection with step 640 of FIG. 6. Further, the program code modules in the memory 860 may include a scheduling module 890 so as to implement the above-described functionalities of controlling the forwarding of the received data packets, e.g., as explained in connection with step 650 of FIG. 6.

It is to be understood that the structures as illustrated in FIG. 8 are merely schematic and that the node may actually include further components which, for the sake of clarity, have not been illustrated, e.g., further interfaces or further processors. Also, it is to be understood that the memory 860 may include further types of program code modules, which have not been illustrated, e.g., program code modules for implementing known functionalities of an node of a data communication system. In some implementations, also a computer program may be provided for implementing functionalities of the node, e.g., in the form of a physical medium storing the program code modules to be stored in the memory 860 or by making such program code available for download or streaming.

As can be seen, the concepts as described above may be used for efficiently controlling the forwarding of data packets in a data communication system. In particular, the delay requirements of the data packets and the importance levels may be considered independently and be used in an orthogonal manner for controlling bandwidth sharing. For example, for delay sensitive traffic resources available resources can be utilized to ensure low delay, but if such resources are not available data packets of the delay sensitive traffic may be dropped to ensure transmission of data packets of higher importance, which however may be less delay sensitive. An exemplary use case is video streaming using SCV (Scalable Video Coding) layers to which different importance levels are assigned. A further exemplary use case is a scenario where a smaller delay is allowable for web traffic than for video streaming, but neither the web traffic nor the video streaming shall have a strict bandwidth priority over the other.

It is to be understood that the examples and embodiments as explained above are merely illustrative and susceptible to various modifications. For example, the concepts may be applied in various kinds of data communication systems or data communication networks. Moreover, it is to be understood that the above concepts may be implemented by using correspondingly designed software to be executed by one or more processors of an existing device, or by using dedicated hardware.

The invention claimed is:

1. A method of handling data traffic, the method comprising:
   a node receiving data packets;
   for each of the received data packets, the node extracting:
      a first value from the data packet, the first value indicating a delay requirement of the data packet; and
      a second value from the data packet, the second value indicating a level of importance assigned to the data packet;
   depending on the respective first value, the node assigning each received data packet to one of multiple delay classes;
   the node estimating a delay associated with forwarding of one of the received data packets;
   the node comparing the estimated delay to the first value extracted from this data packet;
   depending on the comparison, the node detecting that the delay class to which the data packet is assigned is subject to congestion;
   in response to detecting that one of the delay classes is subject to the congestion, the node discarding, depending on the respective second value, one or more of the data packets assigned to at least one other of the delay classes having a stricter delay requirement; and
   the node controlling forwarding of the received data packets based on the first values and the second values.

2. The method of claim 1, further comprising the node discarding, depending on the respective second value, one or more of the data packets assigned to the delay class which is subject to congestion.

3. The method of claim 1,
   wherein the node determines an importance level threshold; and
   wherein the discarded data packets are those data packets for which the second value is below the importance level threshold.

4. The method of claim 1,
   wherein the node applies a discard probability function which, depending on the second value, controls a probability of randomly discarding a data packet;
   wherein the node discards the data packets according to the discard probability function; and
   wherein the node selects a maximum value of the discard probability function for the data packets assigned to at least one other of the delay classes having a stricter delay requirement.

5. The method of claim 1, further comprising, for each of the delay classes, the node providing a corresponding queue.

6. The method of claim 5, wherein the node performs the discarding with respect to data packets to be stored in the queues.

7. The method of claim 5, wherein the node performs the discarding with respect to data packets already stored in the queues.

8. The method of claim 5, wherein the node applies a strict-priority scheduling algorithm for controlling the forwarding of the data packets from the queues.

9. The method of claim 1, wherein the first value and the second value are included in a header section of the data packet.

10. A node for a data communication system, the node comprising:
    at least one interface receiving and forwarding data packets;
    at least one processing circuit;
    memory containing instructions executable by the at least one processing circuit whereby the at least one processing circuit is configured to:
      for each of the received data packets:
        extract a first value from the data packet, the first value indicating a delay requirement of the data packet; and
        extract a second value from the data packet, the second value indicating a level of importance assigned to the data packet;
      depending on the respective first value, assign each received data packet to one of multiple delay classes;
      estimate a delay associated with forwarding of one of the received data packets;
      compare the estimated delay to the first value extracted from this data packet;
      depending on the comparison, detect that the delay class to which the data packet is assigned is subject to congestion;
      in response to detecting that one of the delay classes is subject to the congestion, discard, depending on the respective second value, one or more of the data packets assigned to at least one other of the delay classes having a stricter delay requirement; and
      depending on the first values and the second values, control forwarding of the received data packets.

11. The node of claim 10, wherein the instructions are such that the at least one processing circuit is configured to discard, depending on the respective second value, one or more of the data packets assigned to the delay class which is subject to congestion.

12. The node of claim 10,
    wherein the instructions are such that the at least one processing circuit is configured to determine an importance level threshold; and
    wherein the discarded data packets are those data packets for which the second value is below the importance level threshold.

13. The node of claim 10, wherein the instructions are such that the at least one processing circuit is configured to:
    apply a discard probability function which, depending on the second value, controls a probability of randomly discarding a data packet;
    discard the data packets according to the discard probability function; and
    select a maximum value of the discard probability function for the data packets assigned to at least one other of the delay classes having a stricter delay requirement.

14. The node of claim 10, wherein the instructions are such that the at least one processing circuit is configured to provide a corresponding queue for each of the delay classes.

15. The node of claim 14, wherein the instructions are such that the at least one processing circuit is configured to perform the discarding with respect to data packets to be stored in the queues.

16. The node of claim 14, wherein the instructions are such that the at least one processing circuit is configured to perform the discarding with respect to data packets already stored in the queues.

17. The node of claim 14, wherein the instructions are such that the at least one processing circuit is configured to apply a strict-priority scheduling algorithm for controlling the forwarding of the data packets from the queues.

18. The node of claim 10, wherein the first value and the second value are included in a header section of the data packet.

19. A data communication system, comprising:
a first node; and
a second node;
wherein the first node comprises:
  at least one processing circuit;
  memory containing first instructions executable by the at least one processing circuit of the first node whereby the first node is configured to:
  generate data packets;
  in each of the data packets, include:
    a first value indicating a delay requirement of the data packet; and
    a second value indicating a level of importance assigned to the data packet;
  send the data packets towards a receiver;
wherein the second node comprises:
  at least one processing circuit;
  memory containing second instructions executable by the at least one processing circuit of the second node whereby the second node is configured to:
  receive the data packets,
  for each of the received data packets, extract:
    the first value from the data packet;
    the second value from the data packet;
  depending on the respective first value, assign each received data packet to one of multiple delay classes;
  estimate a delay associated with forwarding of one of the received data packets;
  compare the estimated delay to the first value extracted from this data packet;
  depending on the comparison, detect that the delay class to which the data packet is assigned is subject to congestions;
  in response to detecting that one of the delay classes is subject to the congestion and depending on the respective second value, discard one or more of the data packets assigned to at least one other of the delay classes having a stricter delay requirement; and
  depending on the first values and the second values, control forwarding of the received data packets towards the receiver.

20. The data communication system of claim 19, wherein the second instructions are such that the second node is configured to, depending on the respective second value, discard one or more of the data packets assigned to the delay class which is subject to congestion.

21. The data communication system of claim 19, wherein the second instructions are such that the second node is configured to:

estimate a delay associated with forwarding of one of the received data packets,
compare the estimated delay to the first value extracted from this data packet; and
depending on the comparison, detect that the delay class to which the data packet is assigned is subject to congestion.

22. The data communication system of claim 19,
wherein the second instructions are such that the second node is configured to determine an importance level threshold; and
wherein the discarded data packets are those data packets for which the second value is below the importance level threshold.

23. The data communication system of claim 19, wherein the second instructions are such that the second node is configured to:
apply a discard probability function which, depending on the second value, controls a probability of randomly discarding a data packet;
discard the data packets according to the discard probability function; and
select a maximum value of the discard probability function for the data packets assigned to at least one other of the delay classes having a stricter delay requirement.

24. The data communication system of claim 19, wherein the second instructions are such that the second node is configured to provide a corresponding queue for each of the delay classes.

25. The data communication system of claim 24, wherein the second instructions are such that the second node is configured to perform the discarding with respect to data packets to be stored in the queues.

26. The data communication system of claim 24, wherein the second instructions are such that the second node is configured to perform the discarding with respect to data packets already stored in the queues.

27. The data communication system of claim 24, wherein the second instructions are such that the second node is configured to apply a strict-priority scheduling algorithm for controlling the forwarding of the data packets from the queues.

28. The data communication system of claim 19, wherein the first value and the second value are included in a header section of the data packet.

29. A computer program product stored in a non-transitory computer readable medium for handling data traffic, the computer program product comprising software instructions which, when run on one or more processing circuits of a node, causes the node to:
receive data packets;
for each of the received data packets, extract:
  a first value from the data packet, the first value indicating a delay requirement of the data packet; and
  a second value from the data packet, the second value indicating a level of importance assigned to the data packet;
depending on the respective first value, assign each received data packet to one of multiple delay classes;
estimate a delay associated with forwarding of one of the received data packets;
compare the estimated delay to the first value extracted from this data packet;
depending on the comparison, detect that the delay class to which the data packet is assigned is subject to congestion;

in response to detecting that one of the delay classes is subject to the congestion and depending on the respective second value, discard one or more of the data packets assigned to at least one other of the delay classes having a stricter delay requirement; and
control forwarding of the received data packets based on the first values and the second values.

* * * * *